US012795497B2

(12) United States Patent
Kanneath Abraham et al.

(10) Patent No.: US 12,795,497 B2
(45) Date of Patent: Nov. 10, 2026

(54) NON-CONNECTED STATE CONFIGURATION IN DEVICE HAVING MULTIPLE USER SUBSCRIPTION ENTITIES

(71) Applicant: Nokia Technologies Oy, Espoo (FI)

(72) Inventors: Aby Kanneath Abraham, Bangalore (IN); Faranaz Sabouri-Sichani, Aalborg (DK)

(73) Assignee: Nokia Technologies Oy, Espoo (FI)

(*) Notice: Subject to any disclaimer, the term of this patent is extended or adjusted under 35 U.S.C. 154(b) by 387 days.

(21) Appl. No.: 18/554,054

(22) PCT Filed: Apr. 5, 2022

(86) PCT No.: PCT/FI2022/050217
§ 371 (c)(1),
(2) Date: Oct. 5, 2023

(87) PCT Pub. No.: WO2022/214739
PCT Pub. Date: Oct. 13, 2022

(65) Prior Publication Data
US 2024/0205784 A1 Jun. 20, 2024

(30) Foreign Application Priority Data
Apr. 9, 2021 (FI) ..................................... 20215420

(51) Int. Cl.
*H04W 36/36* (2009.01)
*H04W 36/00* (2009.01)
(Continued)

(52) U.S. Cl.
CPC ..... *H04W 36/362* (2023.05); *H04W 36/0061* (2013.01); *H04W 36/0088* (2013.01); *H04W 76/20* (2018.02); *H04W 88/06* (2013.01)

(58) Field of Classification Search
CPC ......... H04W 36/0061; H04W 36/0088; H04W 36/362
See application file for complete search history.

(56) References Cited

U.S. PATENT DOCUMENTS 10,623,946 B1 4/2020 Kumar et al.
2013/0295920 A1* 11/2013 Viswanadham ...... H04W 76/28 455/426.1
(Continued)

FOREIGN PATENT DOCUMENTS

EP 3764717 A2 1/2021
EP 3800949 A1 4/2021
(Continued)

OTHER PUBLICATIONS

Extended European Search Report received for corresponding European Patent Application No. 22784201.0, dated Mar. 26, 2025, 17 pages.
(Continued)

*Primary Examiner* — Barry W Taylor
(74) *Attorney, Agent, or Firm* — Nokia Technologies Oy

(57) ABSTRACT

When multiple user subscriptions are supported, a configuration used by an apparatus for a first subscription entity, which is in a non-connected state (idle or inactive), is a capability limitation configuration when there is another subscription entity in a connected state with a capability limitation with the first subscription entity, otherwise the configuration used is a non-connected state configuration.

13 Claims, 4 Drawing Sheets

(51) Int. Cl.
*H04W 76/20* (2018.01)
*H04W 88/06* (2009.01)

(56) References Cited

U.S. PATENT DOCUMENTS

| | | | | |
|---|---|---|---|---|
| 2016/0337893 | A1 | 11/2016 | Gheorghiu et al. | |
| 2019/0124533 | A1 | 4/2019 | Tenny et al. | |
| 2020/0329523 | A1 | 10/2020 | Yi et al. | |
| 2020/0396714 | A1 | 12/2020 | Lee | |
| 2021/0120524 | A1* | 4/2021 | Palle | H04W 68/005 |
| 2022/0361132 | A1* | 11/2022 | Gurumoorthy | H04W 60/005 |
| 2022/0408328 | A1* | 12/2022 | Adjakple | H04W 36/0061 |
| 2023/0080113 | A1* | 3/2023 | Hong | H04W 68/02 370/329 |
| 2023/0262811 | A1* | 8/2023 | Li | H04W 8/22 370/329 |
| 2024/0188176 | A1* | 6/2024 | Jung | H04W 60/005 |
| 2025/0142321 | A1* | 5/2025 | Li | H04W 8/183 |
| 2025/0267448 | A1* | 8/2025 | Zhang | H04W 76/16 |
| 2025/0374034 | A1* | 12/2025 | Li | H04W 8/22 |
| 2026/0012773 | A1* | 1/2026 | Xiao | H04W 8/183 |

FOREIGN PATENT DOCUMENTS

| | | | |
|---|---|---|---|
| WO | 2016/028447 | A1 | 2/2016 |
| WO | 2016/204871 | A1 | 12/2016 |
| WO | 2018/141148 | A1 | 8/2018 |
| WO | 2020191524 | A1 | 10/2020 |
| WO | 2020/247043 | A1 | 12/2020 |
| WO | 2021/025491 | A1 | 2/2021 |
| WO | 2021/031060 | A1 | 2/2021 |
| WO | 2021/060893 | A1 | 4/2021 |
| WO | 2021/160284 | A1 | 8/2021 |

OTHER PUBLICATIONS

Office action received for corresponding Indian Patent Application No. 202347068730, dated Jan. 28, 2025, 8 pages.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
"3rd Generation Partnership Project; Technical Specification Group Radio Access Network; NR; User Equipment (UE procedures in Idle mode and RRC Inactive state (Release 16)", 3GPP TS 38.304, V16.3.0, Dec. 2020, pp. 1-39.
"Revised SID: Study on system enablers for multi-SIM devices", TSG SA Meeting #SP-83, SP-190248, Agenda: 17B.19, SA WG2, Mar. 20-22, 2019, 4 pages.
"3rd Generation Partnership Project; Technical Specification Group Services and System Aspects; Study on Support for Multi-USIM Devices (Release 17)", 3GPP TR 22.834, V17.2.0, Dec. 2019, pp. 1-17.
"New WID: Support for Multi-SIM devices in Rel-17", 3GPP TSG RAN Meeting #86, RP-193263, Agenda: 9.1.2, vivo, Dec. 9-12, 2019, 5 pages.
"[Draft] E-mail discussion: [Post111-e][917][Multi-SIM] Multi Sim (vivo)", 3GPP TSG-RAN WG2 Meeting #112e, R2-20xxxxx, Agenda: X.X.X, vivo, Nov. 2-13, 2020, 53 pages.
Office action received for corresponding Finnish Patent Application No. 20215420, dated Dec. 9, 2021, 6 pages.
"On switching notification solutions for MUSIM operation", 3GPP TSG-RAN WG2 Meeting #115 Electronic, R2-2107808, Agenda: 8.3.3, Nokia, Aug. 16-27, 2021, 7 pages.
International Search Report and Written Opinion received for corresponding Patent Cooperation Treaty Application No. PCT/FI2022/050217, dated Jun. 13, 2022, 18 pages.
"Switching notification for basic scenario for Multi-SIM", 3GPP TSG-RAN WG2 Meeting #113-bis Electronic, R2-2103184, Agenda: 8.3.3, Nokia, Apr. 12-20, 2021, 4 pages.
"Discussion on Switching Notification", 3GPP TSG-RAN WG2 Meeting #113bis-e, R2-2103347, Agenda: 8.3.3, vivo, Apr. 12-20, 2021, 8 pages.
"3rd Generation Partnership Project; Technical Specification Group Services and System Aspects; Study on system enablers for devices having multiple Universal Subscriber Identity Modules (USIM) (Release 17)", 3GPP TR 23.761, V1.3.0, Mar. 2021, pp. 1-109.
"Summary of AI 8.3.3: UE notification on network switching for multi-SIM", 3GPP TSG-RAN WG2 Meeting #113bis-e, R2-2104319, Agenda: 8.3.3, Samsung, Apr. 12-20, 2021, 14 pages.

* cited by examiner

NON-CONNECTED STATE CONFIGURATION IN DEVICE HAVING MULTIPLE USER SUBSCRIPTION ENTITIES

RELATED APPLICATION

This application claims priority to PCT Patent Application No. PCT/FI2022/050217, filed Apr. 5, 2022, and entitled "NON-CONNECTED STATE CONFIGURATION IN DEVICE HAVING MULTIPLE USER SUBSCRIPTION ENTITIES", which claims priority to FI application No. 20215420, filed on Apr. 9, 2021, each of which is incorporated herein by reference in its entirety.

TECHNICAL FIELD

Various example embodiments relate to wireless communications.

BACKGROUND

Wireless devices supporting multiple user subscription identities per a device are becoming more and more popular thanks to their flexibility relating to service options and other features. While one of the user subscription identity entities is in an active connected state, a subscription identity entity in a non-connected (an inactive or idle) state may need to shortly monitor its network or shortly communicate with its network. To enable this, a gap may be scheduled, if gaps are allowed in a service that is being used by the subscription identity entity that is in the active state. During the gap no resources to the connected subscription can be scheduled and the gap is used for the subscription identity entity that is in the inactive or idle state.

BRIEF DESCRIPTION

The scope of protection sought for various embodiments is set out by the independent claims. The embodiments, examples and features, if any, described in this specification that do not fall under the scope of the independent claims are to be interpreted as examples useful for understanding various embodiments falling under the scope of the independent claims.

According to an aspect there is provided an apparatus comprising at least one processor; and at least one memory including computer program code, the at least one memory and computer program code configured to, with the at least one processor, cause the apparatus at least to perform: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state.

In an embodiment, the at least one memory and computer program code are configured to, with the at least one processor, cause the apparatus further to at least to perform: sending, using the first subscription entity which is in a connected state in the first wireless communication network, to the first wireless communication network information indicating a need for the second configuration of the first subscription entity in the non-connected state; and receiving at least part of the second configuration as a response to said information.

In embodiments, the first configuration comprises priorities and/or thresholds for neighbor cell detection, cell reselection measurements and/or cell reselection evaluation and the second configuration comprises one or more relaxed priorities and/or thresholds for the cell detection, cell reselection measurements and/or cell reselection evaluation.

In embodiments, the at least one memory and computer program code are configured to, with the at least one processor, cause the apparatus further to at least to perform: detecting, by the first subscription entity when using the second configuration, a need for a gap for cell reselection measurements; checking, by the first subscription entity, in response to the need for a gap, whether first criteria indicated in the second configuration are met; and performing, by the first subscription entity, non-serving cell measurements if the first criteria is met.

In embodiments, the at least one memory and computer program code are configured to, with the at least one processor, cause the apparatus further to at least to perform, when the second configuration comprises an increased validity timer: suspending, by the first subscription entity, when starting to use the second configuration, cell measurements; performing, by the first subscription entity, during periods when the one of one or more further subscription entities in the connected state has discontinued its reception of data, cell measurements; resetting the increased validity timer after performing cell measurements; waiting, after detecting that the one of one or more further subscription entities in the connected state has changed its state to the non-connected state, that the increased validity timer expires; and performing, after the increased validity timer expires, cell measurements according to the first configuration.

In an embodiment, the cell measurements are for early measurement reporting.

In embodiments, the at least one memory and computer program code are configured to, with the at least one processor, cause the apparatus further to at least to perform: checking, in response to no suitable cell being found for the first subscription entity during a cell selection in the non-connected state, whether any of the one or more further subscription entities is in a service; if any of the one or more further subscription entities is in the service, moving the first subscription entity to an out of a service state; otherwise moving the first subscription entity to an any cell selection state.

In embodiments, the at least one memory and computer program code are configured to, with the at least one processor, cause the apparatus further to at least to perform: determining, by the first subscription entity when performing a cell reselection and using the second configuration, whether one or more gaps are needed for system information acquisition; and deferring, if one or more gaps are needed, acquisition of pieces of system information that are not needed when the second configuration is in use.

In embodiments, the at least one memory and computer program code configured to, with the at least one processor, cause the apparatus further to at least to perform: checking, by the first subscription entity when in the non-connected state, whether a second criteria indicated in the second configuration are met; if the second criteria are met performing, by the first subscription entity, measurements and/or system information block reading and/or closed access group with relaxation indicated in the second configuration;

otherwise performing, by the first subscription entity, measurements and/or system information block reading and/or closed access group without the relaxation indicated in the second configuration.

According to an aspect there is provided an apparatus comprising means for performing at least: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state.

According to an aspect there is provided an apparatus comprising at least one processor; and at least one memory including computer program code, the at least one memory and computer program code configured to, with the at least one processor, cause the apparatus at least to perform: providing access to a first wireless communication network; causing sending a first configuration for a non-connected state to a first subscription entity; and causing sending a second configuration for the non-connected state to the first subscription entity.

In an embodiment, the at least one memory and computer program code are configured to, with the at least one processor, cause the apparatus further to at least to perform: receiving, from the first subscription entity which is in a connected state, information indicating a need for the second configuration of the first subscription entity in a non-connected state; and causing sending the second configuration in response to the first subscription entity transitioning from the connected state to the non-connected state.

According to an aspect there is provided an apparatus comprising at least one processor; and at least one memory including computer program code, the at least one memory and computer program code configured to, with the at least one processor, cause the apparatus at least to perform: providing access to a first wireless communication network; causing sending a first configuration for a non-connected state to a first subscription entity; and causing sending a second configuration for the non-connected state to the first subscription entity.

In embodiments, system information broadcast in the first wireless network comprises at least part of the capability limitation configuration.

In embodiments, a radio resource control release message to the first subscription entity comprises at least part of the second configuration.

In embodiments, there is a capability limitation when a frequency the first subscription entity in the non-connected state is camped on or is to measure, or a frequency range, or a specific set of frequencies, including the frequency the first subscription entity in the non-connected state is camped on or is to measure, is usable by one of the first subscription entity and said one of the one or more further subscription entities.

According to an aspect there is provided a method for an apparatus configured to support multiple user subscriptions, the method comprising; using, by a first subscription entity in a non-connected state in a first wireless communication network, a first configuration when none of one or more further subscription entities is in a connected state with a capability limitation with the first subscription entity in the non-connected state in the first wireless network; and using, by the first subscription entity in the non-connected state in the first wireless communication network, a second configuration when one of one or more further subscription entities is in a connected state with a capability limitation with the first subscription entity in the non-connected state.

According to an aspect there is provided a method for an apparatus configured to provide access to a first wireless communication network, the method comprising: causing sending a first configuration for a non-connected state to a first subscription entity; and causing sending a second configuration for the non-connected state to the first subscription entity.

According to an aspect there is provided a computer-readable medium comprising program instructions, which, when run by an apparatus, cause the apparatus to carry out at least one of a first process or a second process, wherein the first process comprises at least: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state; wherein the second process comprises at least: providing access to the first wireless communication network; causing sending the first configuration for a non-connected state to the first subscription entity; and causing sending the second configuration for the non-connected state to the first subscription entity.

According to an aspect there is provided a computer-readable medium comprising program instructions, which, when run by an apparatus, cause the apparatus to carry out at least: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state.

According to an aspect there is provided a computer-readable medium comprising program instructions, which, when run by an apparatus, cause the apparatus to carry out at least: providing access to the first wireless communication network; causing sending the first configuration for a non-connected state to the first subscription entity; and causing sending the second configuration for the non-connected state to the first subscription entity.

In embodiments, the computer readable medium is a non-tangible computer readable medium.

According to an aspect there is provided a non-tangible computer-readable medium comprising program instructions, which, when run by an apparatus, cause the apparatus to carry out at least: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state.

According to an aspect there is provided a non-tangible computer-readable medium comprising program instructions, which, when run by an apparatus, cause the apparatus to carry out at least: providing access to the first wireless communication network; causing sending the first configuration for a non-connected state to the first subscription entity; and causing sending the second configuration for the non-connected state to the first subscription entity.

According to an aspect there is provided a computer program comprising instructions which, when the program is executed by an apparatus, cause the apparatus to carry out at least one of a first process or a second process, wherein the first process comprises at least: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state; wherein the second process comprises at least: providing access to the first wireless communication network; causing sending the first configuration for a non-connected state to the first subscription entity; and causing sending the second configuration for the non-connected state to the first subscription entity.

According to an aspect there is provided a computer program comprising instructions which, when the program is executed by an apparatus, cause the apparatus to carry out at least: supporting multiple user subscriptions; using, by a first subscription entity in a non-connected state in a first wireless communication network, a first configuration when none of one or more further subscription entities is in a connected state with a capability limitation with the first subscription entity in the non-connected state in the first wireless communication network; and using, by the first subscription entity in the non-connected state in the first wireless communication network, a second configuration when one of one or more further subscription entities is in a connected state with a capability limitation with the first subscription entity in the non-connected state.

According to an aspect there is provided a computer program comprising instructions which, when the program is executed by an apparatus, cause the apparatus to carry out at least: providing access to the first wireless communication network; causing sending the first configuration for a non-connected state to the first subscription entity; and causing sending the second configuration for the non-connected state to the first subscription entity.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
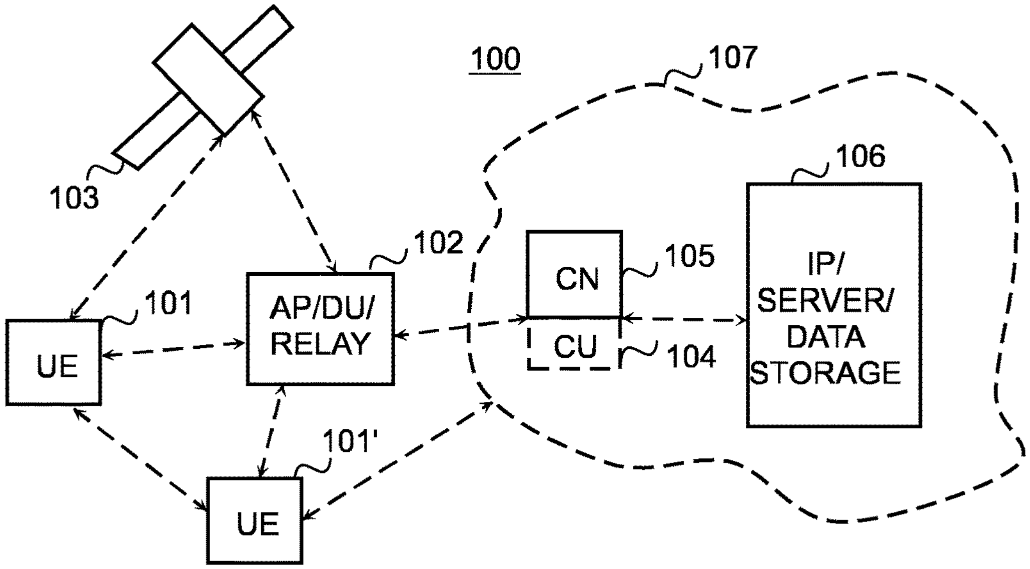
FIG. 1 illustrates an exemplified wireless communication system.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IOT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IOT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). At least one satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs may be needed to provide such a network structure.

For fulfilling the need for improving the deployment and performance of communication systems, the concept of "plug-and-play" (e/g) NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Subscription identities are used to access wireless communication network services. For that purpose, a user device may comprise one or more subscriber identity modules, a module per a subscription identity, for example. In 5G, a universal subscriber identity module (USIM) is a software application residing in a hardware part, called a universal integrated circuit card. The universal integrated circuit card may contain multiple universal subscriber identity modules, thereby supporting multiple subscription identities. For example, there may be subscription identities for different generations of mobile wireless communication networks, including predecessors of 5G, and future wireless communication networks beyond 5G, and/or multiple subscription identities for the substantially same generation wireless communication networks. Further, subscription identities may be from different network operators and/or two or more of them may be from the substantially same network operator. A user device configured to support multiple subscription identities, called in 5G a multi-USIM device, or a MUSIM device, may use common radio network operator. A user device configured to support multiple subscription identities may be implemented to allow one, or some, of corresponding multiple subscription identity entities to be in an active state (connected state), while the other/others is/are in an inactive state or in an idle state. For example, the user device implementation may be based on use of common radio and baseband components shared among the multiple subscription identity entities. A subscription identity entity is called herein a subscription entity. The term "subscription entity" refers herein to a radio protocol stack associated in 5G with a subscription identity.

When a subscription entity is in the inactive state, the subscription entity is registered to the network (wireless communication network) and interacts with the network, but is in a power saving mode, in which an established connection to the network is inactive but existing. The subscription entity may transit to the inactive state from an active connected state, and from the inactive state to the connected state or to an idle state. In the connected state the subscription entity is registered to the network and the established connection to the network is active and the subscription entity can receive and transmit user data, for example. In the idle state the subscription entity is not registered to the network and there is no connection, and the subscription entity may transit to the connected state by establishing a connection. However, even in the idle state the subscription entity interacts with the network. A non-limiting list of interactions in the idle state and in the inactive state include monitoring for paging downlink control information and receiving paging message, receiving updated system information blocks, performing measurements for cell reselection, performing cell selection measurements, performing mobile originated signalling, responding to a paging, sending busy indication, etc. In the inactive state, the interactions include further wireless access network updates. To enable the interaction when another subscription identity is in a connected state using resources that are to be used for the interaction, a gap may be scheduled. During the gap the network connection for the subscription identity entity that is in the connected state is not released even though during the gap network resources are used for the subscription identity entity that is in the idle state or in the inactive state. Herein term non-connected state is used to cover both the idle state and the inactive state, and means a state that is another state than the connected state.

Below different examples are described using, for the sake of clarity of the description, as a user device supporting multiple subscription entities, a user device having two subscription identities and corresponding entities, denoted by UE-A and UE-B. Further, the examples are described in view of UE-A.

Hardware and software capabilities of the user device may affect to simultaneous handling of multiple subscription entities in the user device. For example, the user device may be a single receiver/single transmitter user device, or a dual receiver/single transmitter user device, or a dual receiver/dual transmitter user device. The single receiver/single transmitter user device is capable of receiving traffic from one network and and/or transmitting traffic to one network at a time. The dual receiver/single transmitter user device is capable of simultaneously receiving traffic from two networks but is capable of transmitting to one network at a time. The dual receiver/dual transmitter user device is capable of simultaneously receiving traffic from two networks and/or simultaneously transmitting traffic to two networks. However, there may be capability limitations, for example for a frequency or a frequency range, or a specific set of frequencies, or a radio access technology, or any combinations of them, resulting that a simultaneous traffic is not possible. In other words, for a user device supporting multiple subscription entities, there may be a capability limitation when a frequency a first subscription entity in the non-connected state is camped on or is to measure, a frequency range, or a specific set of frequencies, including the frequency the first subscription entity in the non-connected state is camped on or is to measure, is usable by one of the first subscription entity and one of one or more further subscription entities, said one being in a connected state. In other words, the capability (receiver/transmitter/frequency, etc. listed above), can be used by one of the first subscription entity and one of one or more further subscription entities at a time.

Figure 2:
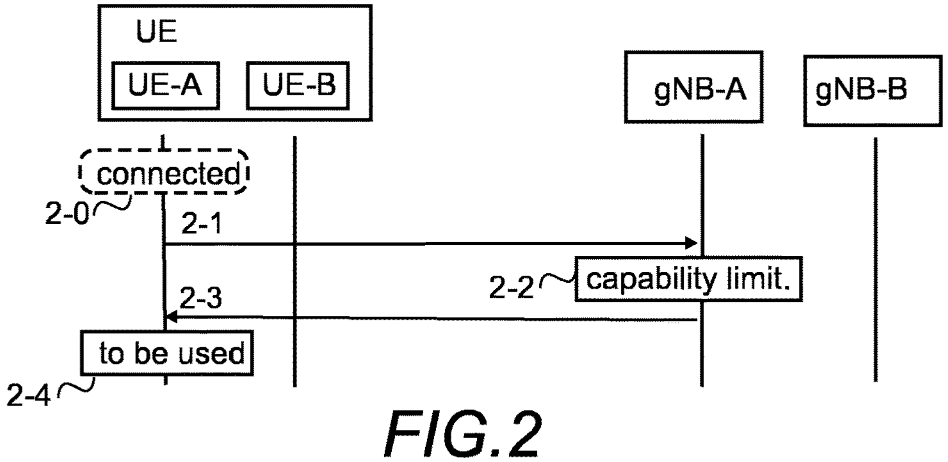
FIGS. 2 to 4 illustrate examples of information exchange.
Figure 3:
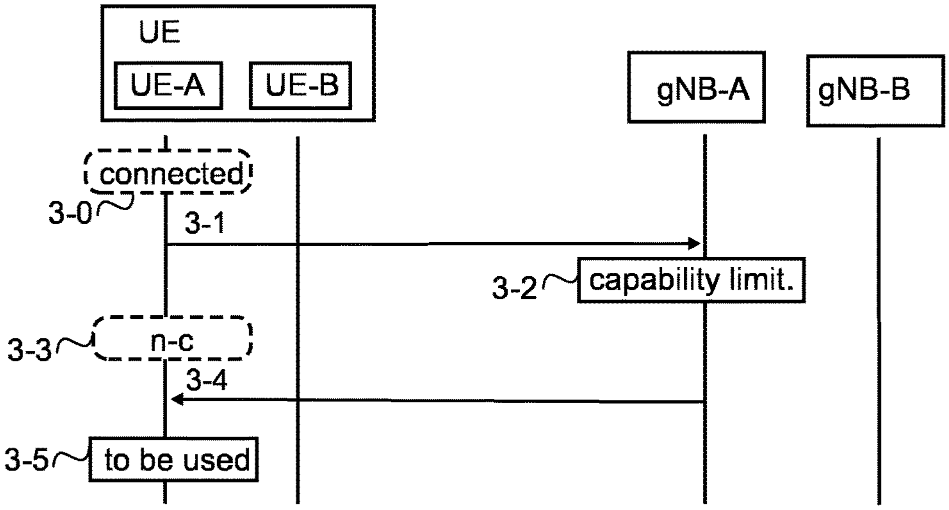
Figure 4:
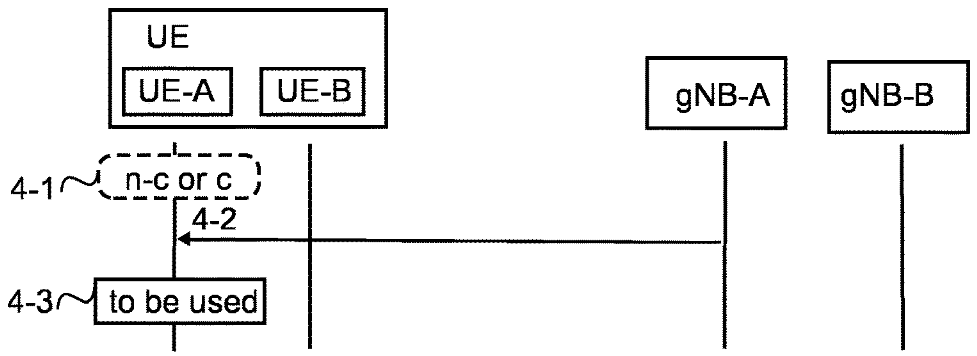

In the examples of FIGS. 2 to 4 it is assumed that the user device UE is a user device that has a capability limitation, the subscription entity UE-A is connected to a wireless network A via an access node, which in the illustrated examples is a base station gNB-A and the subscription entity UE-B may be connected to a wireless network B via an access node, which in the illustrated examples is a base station gNB-B.

Referring to FIG. 2, the UE-A in the connected state (block 2-0) sends message 2-1 to the wireless network, the message containing information indicating a need for a capability limitation configuration, and thereby informing the wireless network on the capability limitation. The information, for example information indicating that the capability information exists, may be sent in MUSIM assistance information, or in a coordinated leave message, which is sent when the UE-A is not able to monitor downlink due to a capability limitation (conflict in frequency/frequency range with UE-B). The information may be a request, for example a specific request for the capability limitation configuration.

The wireless network A determines in block 2-2 capability limitation configuration for the UE-A. The capability limitation configuration is a second configuration for the non-connected state. Depending on an implementation, the wireless network A may use a pre-set capability limitation configuration, or part of the capability limitation configuration may be pre-set, part determined in a case by case manner by the wireless network A, or the capability limitation configuration may be determined by the network A. The capability limitation configuration may depend on services supported by the UE-A and/or by the UE-B, and/or based on current load of the wireless network A. It should be appreciated that the above are mere examples, and other features may affect to the capability limitation configuration. The capability limitation configuration is sent in message 2-3 to the UE-A, to be used (2-4) in the non-connected state. Examples how the information may be used are described below with FIGS. 5 to 10. Message 2-3 may be a radio resource connection release message, such as radio resource control (RRC) release message sent when the UE-A is transitioning from the connected state to the non-connected state (in response to the UE-A informing the wireless network on the transition). Hence the UE-A is still in the connected state, when it receives the capability limitation configuration.

The information exchange illustrated in FIG. 3 differs from the one illustrated in FIG. 2 that in the example of FIG. 3 the capability limitation configuration is sent (message 3-4) to the UE-A when it is in the non-connected (n-c) state (block 3-3) to be used in the non-connected state (block 3-5). In other words, blocks 3-0, 3-2 correspond to blocks 2-0, 2-2 in FIG. 2 and message 3-1 corresponds to message 2-1, the description of which is not repeated in vain herein. The capability limitation configuration information may be sent in system information broadcast, for example in system information block 2.

The information exchange illustrated in FIG. 4 differs from those illustrated in FIGS. 2 and 3, that in the example of FIG. 4, the UE-A is (block 4-1) either in a non-connected (n-c) state or in the connected (c) state, and receives (message 4-2), without informing capability limitation to the wireless network A, the capability limitation configuration to be used in the non-connected state (block 4-3). The capability limitation configuration information may be sent in system information broadcast, for example in system information block 2.

In a further implementations, the capability limitation configuration is sent using two or more messages, for example part when the UE-A is in the connected state, and one or more additional parts when the UE-A is in the non-connected state. For example, the additional parts may indicate a Boolean value, for example by means of a flag, for a feature in the capability limitation configuration.

For example, the capability limitation configuration sent in message 2-3 may be as follows (the bolded text includes the flag indicating whether the user device UE is allowed to override deprioritisation request for the UE-A when capability limitation occurs in a deprioritisation request):

```
RRCRelease-IEs ::=              SEQUENCE {
  deprioritisationReq             SEQUENCE {
    deprioritisationType            ENUMERATED {frequency, nr},
```

-continued

```
deprioritisationTimer                ENUMERATED {min5, min10,
min15, min30}
        overrideDeprioritisationForMUSIMmonitoring boolean
}
}
```

The above is an example of interaction of "Idle Mode Deprioritisation"/"Idle State Deprioritisation"/"Inactive Mode Deprioritisation"/"Inactivee State Deprioritisation" with capability limitation to simultaneously monitor certain frequencies/numerologies for idle/inactive subscription entity in a dual receiver device.

FIGS. 5 to 10 are flow charts illustrating different examples of functionalities performed by the UE-A in the non-connected state, i.e. examples how the capability limitation configuration may be used.

Figure 5:
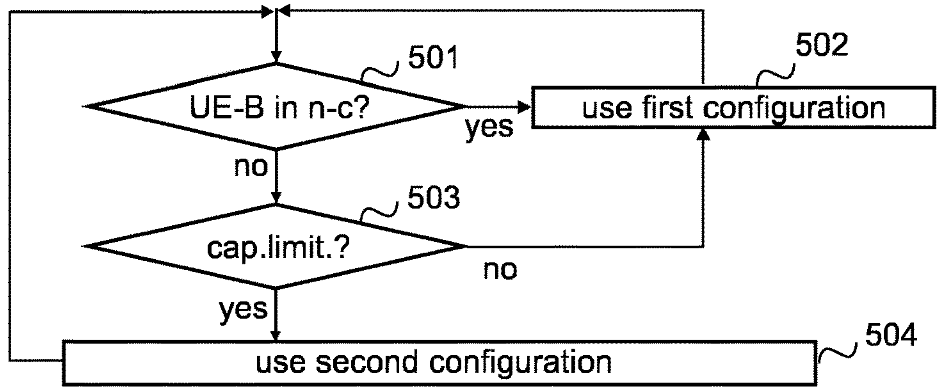
FIGS. 5 to 10 illustrate example functionalities.

FIG. 5 illustrates general principles, in which, as long as the UE-B is also in the non-connected (n-c) state (block 501: yes), the UE-A uses (block 502) a first configuration (a normal non-connected state configuration). When the state of the UE-B changes to connected (block 501: no), it is checked in block 503, whether the UE-B in the wireless network B in the connected state is in a connected state with a capability limitation (cap.limit.) with the UE-A in the non-connected state in the wireless network A. If not (block 503: no), the UE-A uses (block 502) the first configuration. If the UE-B is in the connected state with the capability limitation with the UE-A in the non-connected state (block 503: yes), the UE-A uses a second configuration (the capability limitation configuration described above. i.e. an alternative non-connected state configuration to the normal non-connected state configuration) until the UE-B returns to non-connected state.

It should be appreciated that when the user device is a single receiver device, block 503 is omitted (the answer would always be yes), and when the UE-B is in the connected state, the second configuration is used.

In other words, the UE-A in the non-connected state in the wireless network A uses a non-connected state configuration (first configuration) when none of one or more further subscription entities, i.e. the UE-B, is in a connected state with a capability limitation with the UE-A in the non-connected state in the wireless network, and the UE-A in the non-connected state in the wireless network A uses the capability limitation configuration (second configuration) when one of one or more further subscription entities, i.e. the UE-B, is in a connected state with a capability limitation with the UE-A in the non-connected state in the wireless network A.

An example of what the differences between the first configuration (the normal non-connected state configuration) and the second configuration (the capability limitation configuration) may be is illustrated with a cell reselection. In 5G cell reselection is a complex process involving a number of parameters. Different phases of the cell reselection process include a neighbor cell detection, cell reselection measurements and cell reselection evaluation. The neighbor cell detection is performed first. If one or more neighbor cells are detected, cell reselection measurements are performed. If measurements results fulfill criteria, for example are above a minimum threshold, cell reselection evaluation is performed. Cell reselection or non-connected state (mode) mobility is performed by the subscription entity, but under the guidance of the network. The basic principle is to move the subscription entity to a best cell considering not only signal strength/quality but also network configurations/capabilities/service requirements. This is achieved by providing different priorities to different frequencies and radio access technologies. The subscription entities tend to move to higher priority frequencies/radio access technologies based on parameters configured by the network in system information broadcast message or dedicated configurations given by the network in the radio resource control release message. Such priority based reselection mechanism many times lead to the subscription entities moving back and forth between a higher priority layer and a coverage layer. The capability limitation configuration may provide an alternative configuration, for example by comprising one or more relaxed priorities and/or thresholds for the cell reselection process, i.e. for the neighbor cell detection, cell reselection measurements and/or cell reselection evaluation, for example a set of frequencies/radio access technologies which has to be deprioritised. The UE-A may not measure neighbor cells on lower priority or equal priority frequencies or on the used frequency when the measured serving cell reception level or serving cell reception quality are above certain thresholds provided by the network. For neighbor cells on higher priority frequencies, the UE-A may measure neighbors irrespective of the serving cell measurements. When the UE-A uses the alternative thresholds and priorities in the capability limitation configuration, the UE-A may reselect to a new frequency and use a free reception chain for its non-connected state operations. As a result, the UE-B can continue its connected state operations without a need for any gaps.

Figure 6:
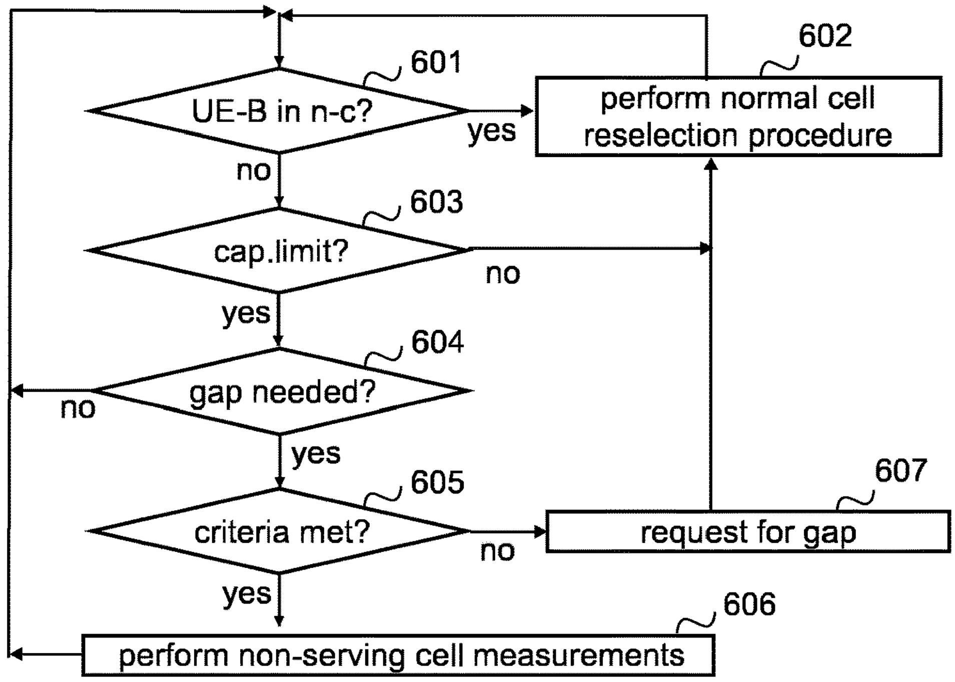

FIG. 6 illustrates an example how relaxing non-connected state measurements (the cell reselection process) may reduce need for any gap. In the illustrated example, the capability limitation configuration comprises additional thresholds, which may have been received in system information broadcast, for example in system information block 2. The normal non-connected configuration may configure the UE-A to perform procedure, for example in 5G according to system information block 3 parameters, or according to system information block 4 parameters, or according to system information block 5 parameters.

Referring to FIG. 6, as long as the UE-B is also in the non-connected (n-c) state (block 601: yes), the UE-A performs (block 602) the normal cell reselection measurements, i.e. uses the normal non-connected configuration (the first configuration). When the state of the UE-B changes to connected (block 601: no), it is checked in block 603, whether the UE-B in the wireless network B in the connected state is in a connected state with a capability limitation (cap.limit.) with the UE-A in the non-connected state in the wireless network A. If not (block 603: no), the UE-A performs (block 602) the normal cell reselection measurements. If the UE-B is in the connected state with the capability limitation with the UE-A in the non-connected state (block 603: yes), the UE-A determines in block 604, whether it needs a gap for cell reselection measurements. When the UE-A detects (block 604: yes) that there is a need for the gap, it uses the additional thresholds in the second configuration when determining in block 605, whether criteria are met. For example, the UE-A may check whether the thresholds are exceeded. In an example, the second configuration (the capability limitation configuration) comprises as the additional thresholds a power threshold and a quality threshold, and the criteria are met if a measured cell selection reception level value, for example a reference signal received power, does not exceed the power threshold and a measured quality of a received signal in the cell, for example reference signal received quality, does not exceed the quality threshold. If the criteria is met (block 605: yes), non-serving cell measurements are performed in block 606. (In the non-connected state a serving cell is the camped on cell, and other cells are non-serving cells.) However, if the criteria is not met (block 605: no), the UE-A requests in block 607 the gap and performs in block 602 the normal cell reselection measurements during the gap.

It should be appreciated that when the user device is a single receiver device, block 603 is omitted (the answer would always be yes), and when the UE-B is in the connected state (block 601: no), the process proceeds to block 604 to check whether a gap is needed.

As can be seen, the additional one or more thresholds will be used when gaps are needed, but thanks to them additional measurements may be performed before requesting for a gap. This way the number of gaps, and the time the UE-B cannot be scheduled may be reduced.

Figure 7:
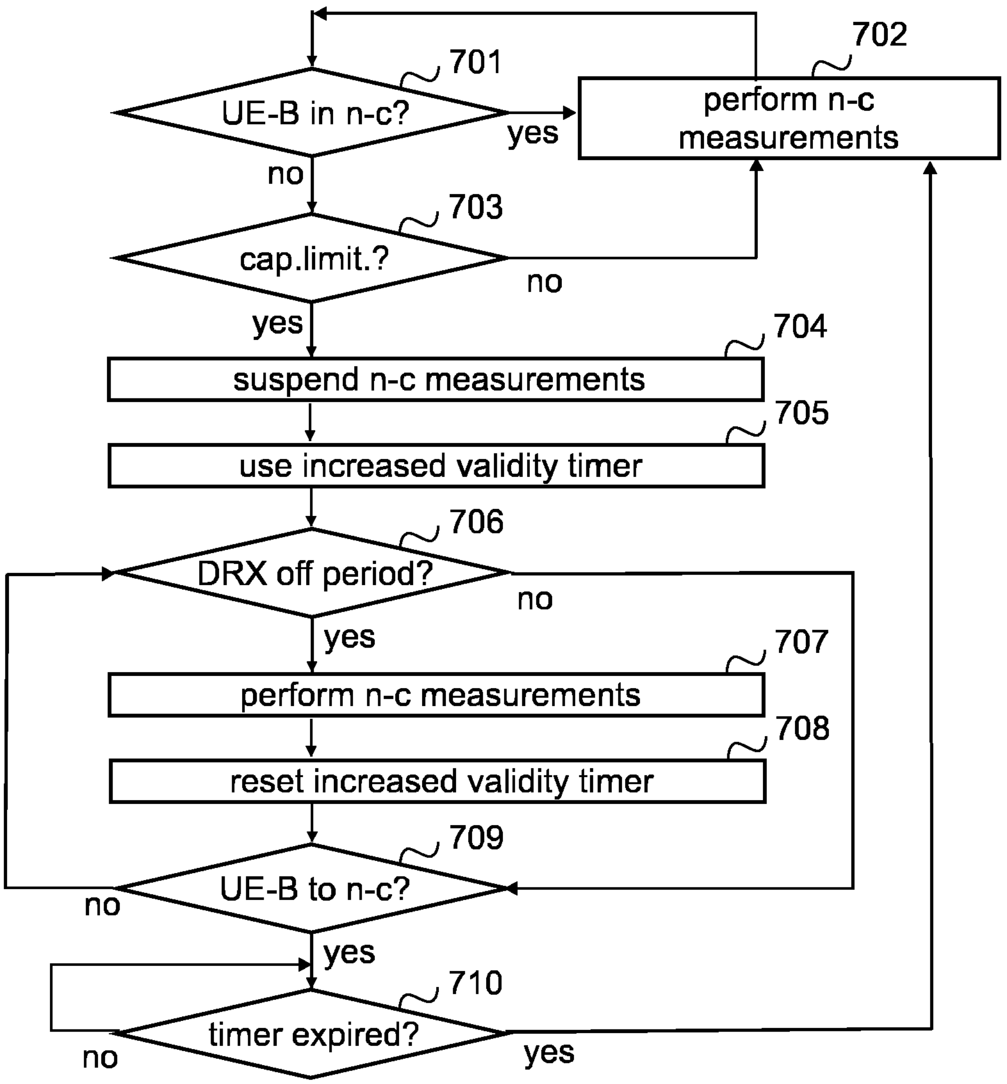

FIG. 7 illustrates an example in which the capability configuration information contains an increased measurement validity timer. Further, in the example it is assumed that the UE-B has been configured to apply connected mode discontinuous reception (connected state discontinuous reception) with a shorter period than the value of the increased measurement validity timer.

Referring to FIG. 7, as long as the UE-B is also in the non-connected state (block 701: yes), the UE-A performs (block 702) the normal cell measurements in the non-connected state, i.e. uses the normal non-connected configuration. When the state of the UE-B changes to connected (block 701: no), it is checked in block 703, whether the UE-B in the wireless network B in the connected state is in a connected state with a capability limitation (cap.limit.) with the UE-A in the non-connected state in the wireless network A. If not (block 703: no), the UE-A performs (block 702) the normal cell measurements. If the UE-B is in the connected state with the capability limitation with the UE-A in the non-connected state (block 703: yes), the UE-A suspends in block 704 cell measurements, and starts in block 705 use the increased validity timer. When the discontinuous reception (DRX) in the UE-B has an off period (block 706: yes), i.e. the UE-B is not receiving, the UE-A performs in block 707, cell measurements, and resets in block 708 the increased validity timer. Blocks 706 to 708 are repeated until the UE-A detects (block 709) that the UE-B changes its state to non-connected. After detecting that the UE-B changed its state to the non-connected state (block 709: yes), it is waited (block 710) until the increased validity timer expires. After the increased validity timer expires (block 710: yes), the UE-A performs in block 702 cell measurements according to the non-connected state configuration.

It should be appreciated that when the user device is a single receiver device, block 703 is omitted (the answer would always be yes), and when the UE-B is in the connected state (block 701: no), the process proceeds to block 704 to suspend cell measurements.

The cell measurements principles in the example of FIG. 7 may be used also for early reporting. Early reporting mean that the UE-A would be configured to report idle/inactive measurements for faster configuration of dual connectivity and/or carrier aggregation. As can be seen from FIG. 7, there is no need for the UE-A to request any additional measurement gaps for these idle/inactive measurements, i.e. for early reporting.

Figure 8:
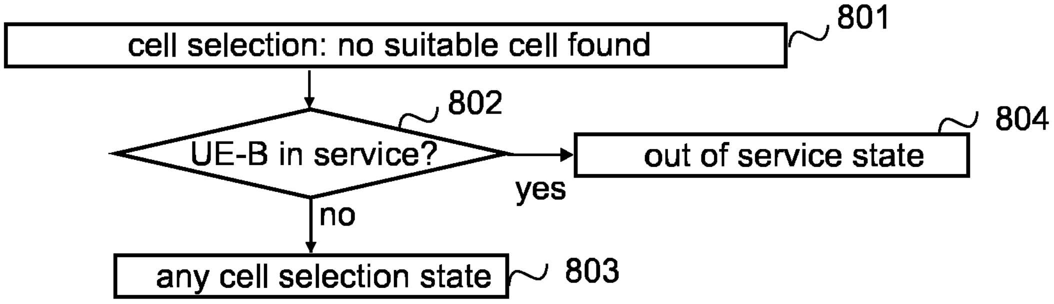

FIG. 8 illustrates an example, when the UE-A does not found (block 801) in a cell selection procedure a suitable cell to be camped on. Therefore the UE-A checks in block 802, whether the UE-B is in service, i.e. whether it is in a connected state for a service or in the idle state in a service or in the inactive state in a service. If the UE-B is not in service (block 802: no), the UE-A moves in block 803 to an any cell selection state to look for an acceptable cell, and while looking, being usable for emergency calls or capable to receive commercial mobile alert service messages and earthquake and tsunami warning service messages, for example. In the any cell selection state the UE-A performs cell reselection measurements/evaluations, paging monitoring, acquisition of system information etc However, if the UE-B is in service (block 802; yes), the UE-A will move in block 804 to out of service state, in which the UE-A do not look for an acceptable cell. Since the UE-B is in service, emergency calls can be made through the UE-B, and receiving commercial mobile alert service messages and/or earthquake and tsunami warning service messages through the UE-B is possible.

It should be appreciated that the functionality described with FIG. 8 may be implemented regardless whether any second configuration is received. In other words, the user device may be configured to perform the functionality separately from the second configuration, or as part of the second configuration.

Figure 9:
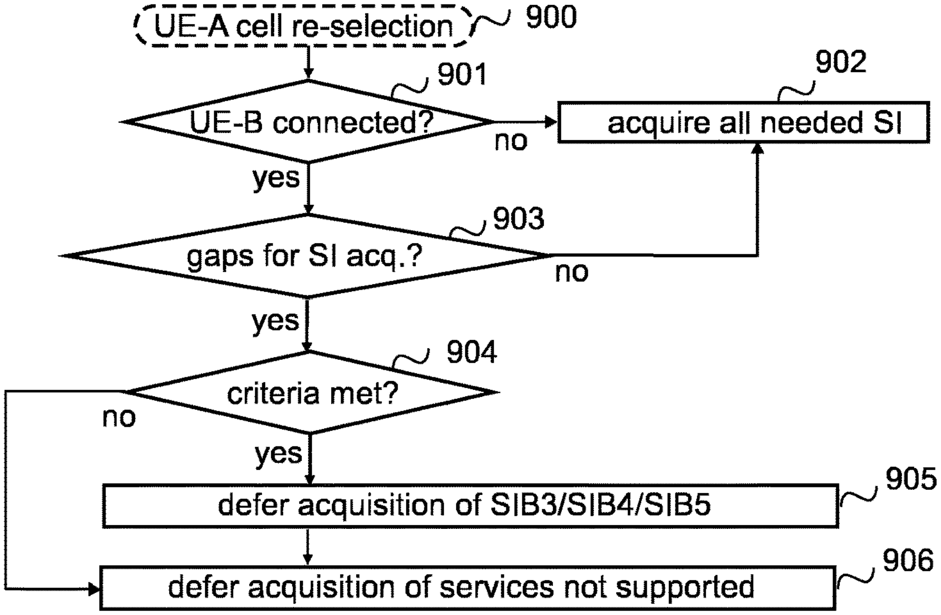

FIG. 9 illustrates a further example, which may be used by the UE-A in the idle state for acquisition of system information, as part of a cell reselection process (block 900). The system information is downlink broadcast information transmitted periodically. The system information comprises a master information block and a number of system information blocks, a system information block being comprised either in minimum system information or in other system information. The minimum system information comprises basic information needed for initial access and information for acquiring any other system information.

Referring to FIG. 9, if the UE-B is not in the connected state (block 901: no), all needed system information (SI) is acquired in block 902. If the UE-B is in the connected stated, the UE-A determines in block 903 whether one or more gaps are needed for system information acquisition (SI acq.). If no gaps are needed (block 903: no) all needed system information (SI) is acquired in block 902.

If one or more gaps are needed (block 903: yes), in the illustrated example it is checked in block 904, whether criteria are met. The criteria may be met, if the capability limitation configuration comprises one or more relaxed measurement conditions that all are true and/or the UE-A is pre-configured with one or more condition, that, when met, allow relaxation, for example deferring system information block reading until it is needed. If the criteria is met (block 904: yes), i.e. relaxed measurements may be used, acquisition of corresponding system information, for example system information block 3 (SIB3)/information block 4 (SIB4)/system information block 5 (SIB5), is deferred in block 905, and also acquisition of services not supported by the UE-A in the non-connected mode is deferred in block 906.

However, if the criteria are not met (block 904: no), i.e. relaxed measurements may not be used, acquisition of services not supported by the UE-A in the non-connected mode is deferred in block 906. The services not supported include services that cannot be activated by the UE-A when the UE-B is in the connected state.

Deferral in block 906 may contain also services that can tolerate the delay for acquisition of corresponding system information when the service is needed.

It should be appreciated that when the user device is a single receiver device, block 903 is omitted (the answer would always be yes), and when the UE-B is in the connected state (block 901: yes), the process proceeds to block 904 to check whether the criteria is met.

In other words, when one or more gaps are needed, acquisition of pieces of system information that are not needed when the capability limitation configuration is in use may be referred. It may that the pieces may be needed at a time when the UE-B is not anymore in the connected state, and hence the pieces may be acquired without any gaps.

Figure 10:
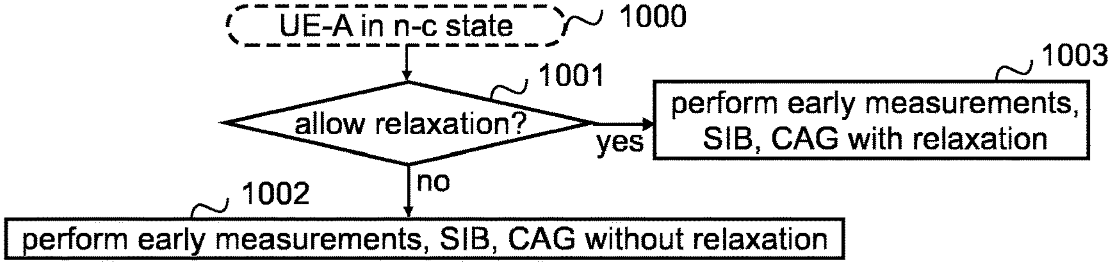

The substantially same criteria as used in the example of FIG. 9, i.e. is a deferred manner allowed, may be used by the UE-A in the non-connected state (block 1000) for early measurements and/or for system information block (SIB) reading and/or for closed access group cell reselection. Referring to FIG. 10, when the relaxation is not allowed (block 1001: no), early measurements and/or for system information block (SIB) reading and/or for closed access group cell reselection are performed in block 1002 without relaxation (without deferring them). However, when the relaxation is allowed (block 1001: yes), early measurements and/or for system information block (SIB) reading and/or for closed access group cell reselection are performed in block 1003 with relaxation (with deferring them).

The allowability of the relaxation may be indicated by a flag either allowing the relaxation (when a default is no relaxation) or by a flag declining the relaxation (when the default is to use the relaxed criteria unless the network configures not to allow the relaxation). In an implementation one flag is used for the early measurement, the system information block reading and the closed access group cell reselection. In another implementation three flags are used, one for the early measurement, one flag for the system information block reading and one flag for the closed access group cell reselection. Naturally any other means than the flag/flags may be used to convey the same information.

As can be seen from the above examples, different solutions reducing needs for gaps, or the number of gaps and/or their duration are disclosed. Hence, the disclosed solutions may lead to overall performance improvement in the user device supporting multiple user subscription entities. For example, when a user subscription entity in the connected state is having less time without scheduling because of gaps needed, it may move faster to the idle state or the inactive state and the previously idle/inactive user subscription entity may move faster to the connected state for its services requiring the connected state.

It should be appreciated that there may be different non-connected state configurations, or at least capability limitation configurations for the idle state and for the inactive state.

The blocks, related functions, and information exchanges described above by means of FIGS. 2 to 10 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 11:
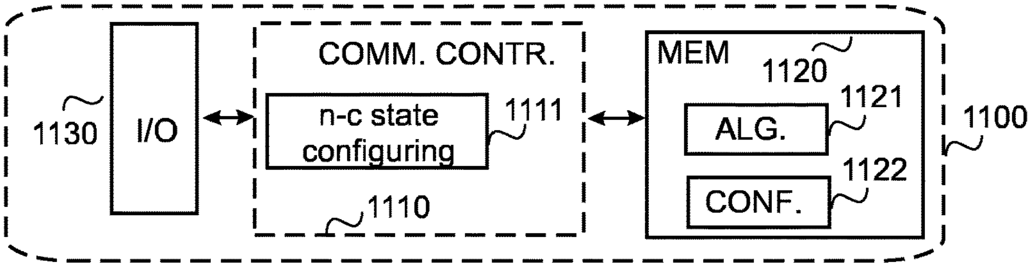
FIGS. 11 and 12 are schematic block diagrams.
Figure 12:
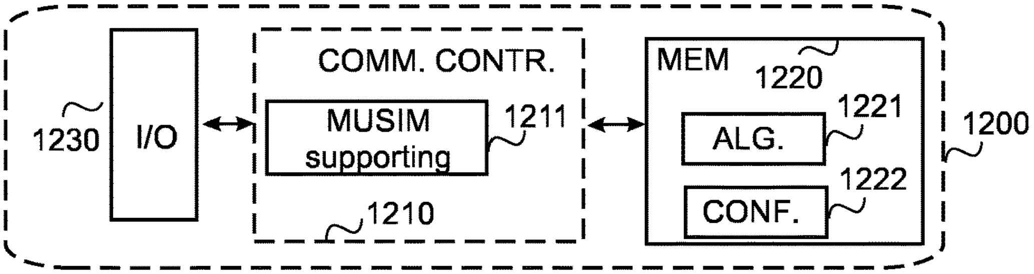

FIGS. 11 and 12 illustrate apparatuses comprising a communication controller 1110, 1210 such as at least one processor or processing circuitry, and at least one memory 1120, 1220 including a computer program code (software, algorithm) ALG. 1121, 1221, wherein the at least one memory and the computer program code (software, algorithm) are configured, with the at least one processor, to cause the respective apparatus to carry out any one of the embodiments, examples and implementations described above. FIG. 11 illustrates an apparatus configured to provide wireless access and non-connected state configurations, including relaxed configurations, to user devices, or any corresponding apparatus, supporting multiple user subscription identities, and FIG. 12 illustrates an apparatus for operating in a non-connected state as configured by the apparatus in FIG. 11. The apparatuses of FIGS. 11 and 12 may be electronic devices, for example a wearable device, a home appliance device, a smart device, like smart phone or smart screen, a vehicular device, just to name couple of examples in addition to those listed with FIG. 1.

Referring to FIGS. 11 and 12, the memory 1120, 1220 may be implemented using any suitable data storage technology, such as semiconductor based memory devices, flash memory, magnetic memory devices and systems, optical memory devices and systems, fixed memory and removable memory. The memory may comprise a configuration storage CONF. 1121, 1221, such as a configuration database, for example for storing non-connected state configurations. The memory 1120, 1220 may further store other data, such as a data buffer for data waiting to be processed (including transmission) for a connected state service.

Referring to FIG. 11, the apparatus, for example gNB, comprises a communication interface 1130 comprising hardware and/or software for realizing communication connectivity according to one or more wireless and/or wired communication protocols. The communication interface 1130 may provide the apparatus with radio communication capabilities with user devices (terminal devices, apparatuses) camping in one or more cells controlled by the apparatus, as well as communication capabilities towards a wired network.

Digital signal processing regarding transmission and reception of signals may be performed in a communication controller 1110. The communication interface may comprise standard well-known components such as an amplifier, filter, frequency-converter, (de)modulator, and encoder/decoder circuitries and one or more antennas.

The communication controller 1110 comprises a non-connected (n-c) state configuring processing circuitry 1111 configured to configure user devices with non-connected state configuration(s) according to any one of the embodiments/examples/implementations described above. The communication controller 1110 may control the non-connected state configuring processing circuitry 1111.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with the wireless network A (or gNB-A).

Referring to FIG. 12, the apparatus 1200 may further comprise a communication interface 1230 comprising hardware and/or software for realizing communication connectivity according to one or more communication protocols. The communication interface 1230 may provide the apparatus 1200 with communication capabilities with the apparatus of FIG. 11. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1210.

The communication controller 1210 comprises a multiple subscriber identity (MUSIM) supporting processing circuitry 1211 configured to use received non-connected state configurations according to any one of the embodiments/examples/implementations described above. The multiple subscriber identity supporting processing circuitry 1211 may be configured to request or otherwise indicate a need for capability limitation configurations according to any one of the embodiments/examples/implementations described above. The communication controller 1210 may control the multiple subscriber identity supporting processing circuitry 1211. Depending on an implementation, one or more timers may be controlled by the communication controller 1210 and/or by the multiple subscriber identity supporting processing circuitry 1211.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 10 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

ABBREVIATIONS

4G: fourth generation
5G: fifth generation
ACK: acknowledgement
AP: access point
ASIC: application-specific integrated circuit
CAG: closed access group c: connected
cap.limit.: capability limitation
CN: core network
CU: centralized unit
CPS: cyber-physical system
DRX: discontinuous reception
DSDP: digital signal processing device
DSP: digital signal processor
DU: distributed unit
(e/g)NodeB: (evolved/next generation) node B
E-UTRA: evolved UMTS terrestrial radio access
E-UTRAN: evolved universal mobile telecommunications system radio access network
FPGA: field programmable gate array
GEO: geostationary earth orbit
GHz: gigahertz
gNB: next generation nodeB
H(e/g)nodeBs: home (evolved/next generation) node Bs
HNB: home node B
HNB-GW: home node B gateway
IAB: integrated access and backhaul
ICT: information and communications technology
IE: information element
IMS: Internet Protocol multimedia subsystems
IoT: internet of things
IP: internet protocol
LEO: low earth orbit
LTE: long term evolution
LTE-A: long term evolution advanced
MANET: mobile ad-hoc network
MEC: multi-access edge computing
MME: mobile management entity
mMTC: (massive) machine-type communications
MT: mobile termination
M2M: machine-to-machine
MUSIM: multiple subscription identities, multiple universal subscriber identity
modules
n-c: non-connected
NGC: next generation core
NR: new radio
NVF: network function virtualization
PCS: personal communications services
PDA: personal digital assistant
P-GW: packet data network gateway
PLD: programmable logic device
RAM: random access memory
RAN: radio access network
RAT: radio access technology
RI: radio interface
ROM: read only memory
RRC: radio resource control
SDN: software defined networking
S-GW: serving gateway
SI: system information
SI acq.: system information acquisition
SIB: system information block
SIM: subscriber identification module
UE: user device or user equipment
UMTS: universal mobile telecommunications system
USIM: universal subscriber identity module
UTRAN: universal mobile telecommunications system radio access network
UWB: ultra-wideband
WCDMA: wideband code division multiple access
WiFi: wireless local area network
WiMAX: worldwide interoperability for microwave access
WLAN: wireless local area network

The invention claimed is:

1. An apparatus comprising
at least one processor; and
at least one memory including computer program code, the at least one memory and computer program code configured to, with the at least one processor, cause the apparatus at least to perform:
sending, to a first wireless communication network, information on a capability limitation associated with a support of multiple universal subscriber identity modules, MUSIM, operation, the capability limitation relating to a restriction of at least one capability of the apparatus while operating in a MUSIM mode, wherein the apparatus is in a connected state in the first wireless communication network, and wherein the information on the capability limitation indicates a need for a second configuration of a first subscription entity;
using, by the first subscription entity, a first configuration when none of one or more further subscription entities has the capability limitation; and
using, by the first subscription entity, the second configuration when one of one or more further subscription entities has the capability limitation.

2. The apparatus of claim 1, wherein the at least one memory and computer program code are configured to, with the at least one processor, cause the apparatus further to at least perform:
receiving at least part of the second configuration as a response to said information.

3. The apparatus of claim 1, wherein the first configuration comprises priorities and/or thresholds for neighbor cell detection, cell reselection measurements and/or cell reselection evaluation and the second configuration comprises one or more relaxed priorities and/or thresholds for the cell detection, cell reselection measurements and/or cell reselection evaluation.

4. The apparatus of claim 1 wherein the at least one memory and computer program code are configured to, with the at least one processor, cause the apparatus further to at least perform:
detecting, by the first subscription entity when using the second configuration, a need for a gap for cell reselection measurements;
checking, by the first subscription entity, in response to the need for a gap, whether first criteria indicated in the second configuration are met; and
performing, by the first subscription entity, non-serving cell measurements if the first criteria is met.

5. The apparatus of claim 1, wherein the at least one memory and computer program code are configured to, with the at least one processor, cause the apparatus further to at least perform, when the second configuration comprises an increased validity timer:
suspending, by the first subscription entity, when starting to use the second configuration, cell measurements;
performing, by the first subscription entity, during periods when the one of one or more further subscription entities in the connected state has dis-continued its reception of data, cell measurements;
resetting the increased validity timer after performing cell measurements;

waiting, after detecting that the one of one or more further subscription entities in the connected state has changed its state to the non-connected state, that the increased validity timer expires; and performing, after the increased validity timer expires, cell measurements according to the first configuration.

6. The apparatus of claim 5, wherein the cell measurements are for early measurement reporting.

7. The apparatus of claim 1, wherein the at least one memory and computer program code are configured to, with the at least one processor, cause the apparatus further to at least perform:

checking, in response to no suitable cell being found for the first sub-scription entity during a cell selection in the non-connected state, whether any of the one or more further subscription entities is in a service;

if any of the one or more further subscription entities is in the service, moving the first subscription entity to an out of a service state;

otherwise moving the first subscription entity to an any cell selection state.

8. The apparatus of claim 1, wherein the at least one memory and computer program code are configured to, with the at least one processor, cause the apparatus further to at least perform:

determining, by the first subscription entity when performing a cell reselection and using the second configuration, whether one or more gaps are needed for system information acquisition; and deferring, if one or more gaps are needed, acquisition of pieces of system information that are not needed when the second configuration is in use.

9. The apparatus of claim 1, wherein the at least one memory and computer program code are configured to, with the at least one processor, cause the apparatus further to at least perform:

checking, by the first subscription entity, whether a second criteria indicated in the second configuration are met;

if the second criteria are met performing, by the first subscription entity, measurements and/or system information block reading and/or closed access group with relaxation indicated in the second configuration;

otherwise performing, by the first subscription entity, measurements and/or system information block reading and/or closed access group without the relaxation indicated in the second configuration.

10. The apparatus of claim 1, wherein a radio resource control release message to the first subscription entity comprises at least part of the second configuration.

11. The apparatus of claim 1, wherein there is a capability limitation when a frequency the first subscription entity is camped on or is to measure, or a frequency range, or a specific set of frequencies, including the frequency the first subscription entity is camped on or is to measure, is usable by one of the first subscription entity and said one of the one or more further subscription entities.

12. The apparatus of claim 1, wherein the at least one memory and computer program code configured to, with the at least one processor, cause the apparatus further to at least to perform:

sending the information on the capability limitation in an assistance information message.

13. A method for an apparatus, the method comprising:

sending, to a first wireless communication network, information on a capability limitation associated with a support of multiple universal subscriber identity modules, MUSIM, operation, the capability limitation relating to a restriction of at least one capability of the apparatus while operating in a MUSIM mode, wherein the apparatus is in a connected state in the first wireless communication network, and wherein the information on the capability limitation indicates a need for a second configuration of a first subscription entity;

using, by the first subscription entity, a first configuration when none of one or more further subscription entities has the capability limitation; and using, by the first subscription entity, the second configuration when one of one or more further subscription entities has the capability limitation.

* * * * *